United States Patent
Hamamoto

(10) Patent No.: US 11,067,008 B2
(45) Date of Patent: Jul. 20, 2021

(54) INTERNAL COMBUSTION ENGINE CONTROL METHOD AND INTERNAL COMBUSTION ENGINE CONTROL DEVICE

(71) Applicant: NISSAN MOTOR CO., LTD., Yokohama (JP)

(72) Inventor: Takayuki Hamamoto, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/962,430

(22) PCT Filed: Jan. 16, 2018

(86) PCT No.: PCT/JP2018/000929
§ 371 (c)(1),
(2) Date: Jul. 15, 2020

(87) PCT Pub. No.: WO2019/142226
PCT Pub. Date: Jul. 25, 2019

(65) Prior Publication Data
US 2021/0156318 A1    May 27, 2021

(51) Int. Cl.
*F02D 13/02* (2006.01)
*F02D 41/04* (2006.01)

(52) U.S. Cl.
CPC ......... *F02D 13/0215* (2013.01); *F02D 41/04* (2013.01)

(58) Field of Classification Search
CPC ............................. F02D 13/0215; F02D 41/04
USPC ............................ 123/90.11, 90.15; 701/103
See application file for complete search history.

(56) References Cited

U.S. PATENT DOCUMENTS

2010/0269801 A1   10/2010  Kitamura et al.
2015/0136070 A1    5/2015  Matsushima

FOREIGN PATENT DOCUMENTS

| EP | 1 953 375 A1 | 8/2008 |
| JP | 11-280505 A | 10/1999 |
| JP | 2000-328968 A | 11/2000 |
| JP | 2004-116434 A | 4/2004 |
| JP | 2007-16685 A | 1/2007 |

*Primary Examiner* — Hai H Huynh
(74) *Attorney, Agent, or Firm* — Foley & Lardner LLP

(57) ABSTRACT

When an operation state switches from a first operation region A to a second operation region B, the valve timing of an intake valve and an exhaust valve is switched upon switching of the operation state from the first operation region A to the second operation region B. When the operation state switches from the first operation region A to the second operation region B, the air-fuel ratio is switched after a first predetermined time T1 has elapsed since when the actual valve timing of the intake valve became a second intake valve timing and the actual valve timing of the exhaust valve became a second exhaust valve timing. In this way, it becomes possible to ensure ignition when the operation state switches.

6 Claims, 4 Drawing Sheets

INTERNAL COMBUSTION ENGINE CONTROL METHOD AND INTERNAL COMBUSTION ENGINE CONTROL DEVICE

BACKGROUND

The present disclosure relates to an internal combustion engine control method and an internal combustion engine control device.

A patent document 1 discloses an art of controlling an air fuel ratio, taking account of a correlation between an internal EGR (or residual gas) and a valve overlap period (or valve overlap amount) in which an intake valve opening period and an exhaust valve opening period overlap with each other, so as to suppress combustion stability from being adversely affected during a shift of the air fuel ratio.

According to patent document 1, during a shift of the air fuel ratio from a stoichiometric air fuel ratio setting or richer to a lean-burn combustion control in which an air-fuel mixture leaner than the stoichiometric air fuel ratio setting is burnt, lean-burn combustion is inhibited until the valve overlap amount has actually converged at a target value for lean-burn combustion to some extent.

However, only by controlling the valve overlap amount, it is difficult to suppress the internal EGR (residual gas) during shifting of the air fuel ratio. In some situations, the air-fuel mixture may be resistant to ignition due to an increase in the internal EGR.

Namely, there is room for further improvement in the combustion stability during the combustion mode shift control for shifting the air fuel ratio.

PATENT DOCUMENT(S)

Patent Document 1: Japanese Patent Application Publication No. H11-280505

SUMMARY

According to the present disclosure, an internal combustion engine is configured to start a shift of an air fuel ratio after exhaust valve timing is actually set at a second exhaust valve timing setting, in response to a shift of an operating state from a first operation region into a second operation region, wherein the first operation region is for operating the internal combustion engine with the air fuel ratio set at a predetermined air fuel ratio setting, wherein the second operation region is for operating the internal combustion engine with the air fuel ratio set leaner than the predetermined air fuel ratio setting, and wherein the second exhaust valve timing setting is employed in the second operation region.

This configuration allows reliable ignition during shifting of the operating state, and thereby prevents misfiring and ensures functional reliability, and improves exhaust performance and fuel efficiency.

DETAILED DESCRIPTION

The following describes an embodiment of the present disclosure in detail with reference to the drawings.

Figure 1:
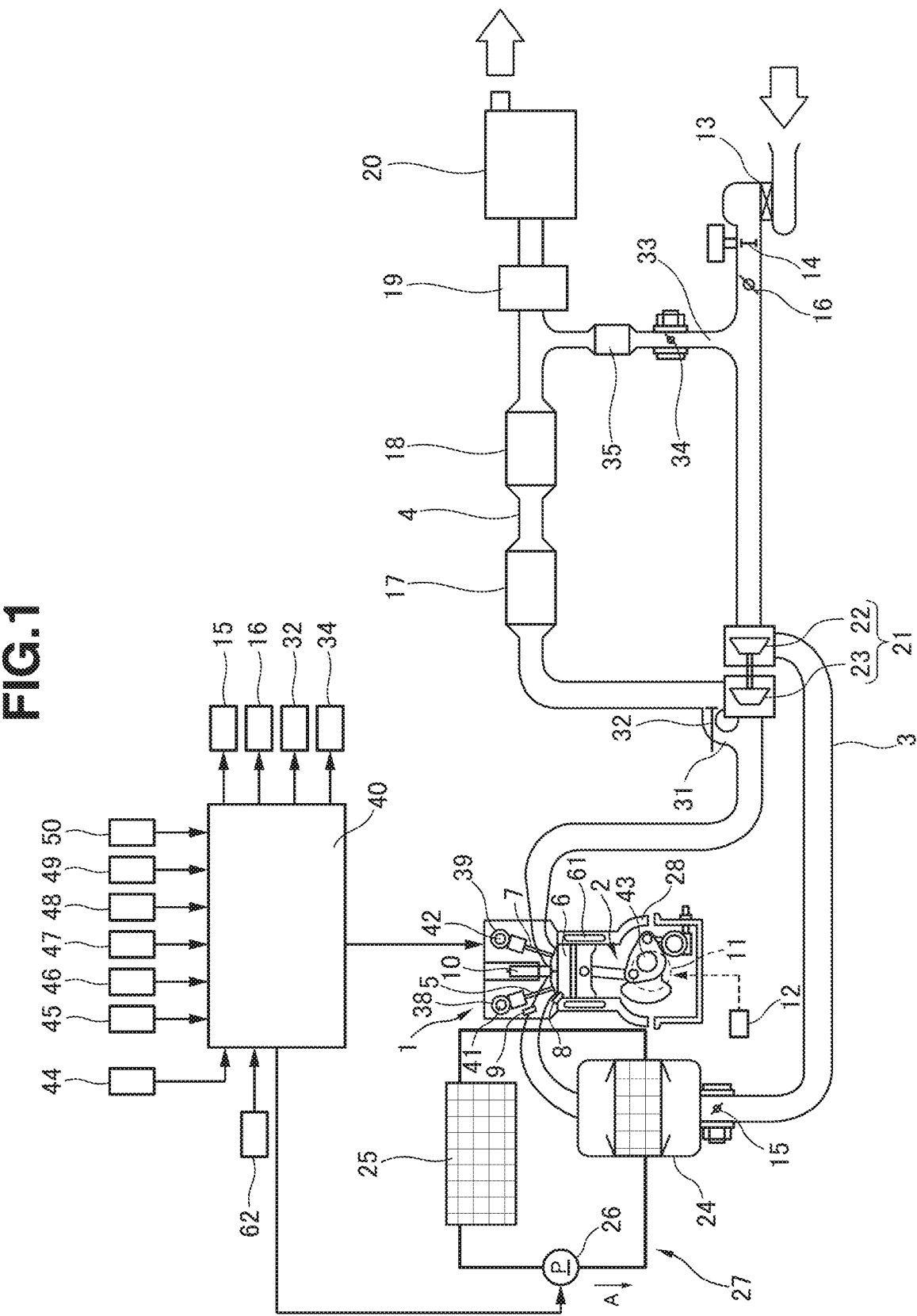
FIG. 1 is an explanatory diagram schematically showing configuration of an internal combustion engine according to the present disclosure.

FIG. 1 is an explanatory diagram schematically showing configuration of an internal combustion engine 1 according to the present disclosure.

Internal combustion engine 1 is a four-stroke cycle spark-ignition engine equipped with a variable compression ratio mechanism 2 employing a multi-link piston crank mechanism, and is mounted as a drive source on a vehicle such as an automobile.

Variable compression ratio mechanism 2 employs a publicly-known multi-link piston crank mechanism as described in JP 2004-116434 A.

Internal combustion engine 1 is mounted as a drive source on a vehicle such as an automobile, and is provided with an intake passage 3 and an exhaust passage 4. Intake passage 3 is connected to a combustion chamber 6 via an intake valve 5. Exhaust passage 4 is connected to combustion chamber 6 via an exhaust valve 7.

Internal combustion engine 1 includes a first fuel injection valve 8 for directly injecting fuel into combustion chamber 6, and a second fuel injection valve 9 for injecting fuel into a section of intake passage 3 upstream of intake valve 5.

First fuel injection valve 8 is structured to perform multi-stage injection for injecting fuel a plurality of times per combustion cycle.

In the present embodiment, second fuel injection valve 9 is structured to inject fuel supplementally when in a limited operation region of high speed and high load in a first operation region "A" described below.

Fuel injected from first fuel injection valve 8 and second fuel injection valve 9 is ignited in combustion chamber 6 by an ignition plug 10.

Internal combustion engine 1 is further structured to receive a driving force from a motor 11 as a driving unit. Motor 11 is structured to be driven by electric power of a motor battery 12, and generate electric power.

Internal combustion engine 1 is connected to intake passage 3 in which an air cleaner 13, an air flow meter 14, a first throttle valve 15, and a second throttle valve 16 are provided, wherein air cleaner 13 is structured to collect foreign matter contained in intake air, wherein air flow meter 14 is structured to sense an intake air quantity, wherein first throttle valve 15 is an electric one, and wherein second throttle valve 16 is an electric one arranged upstream of first throttle valve 15.

Air flow meter 14 is arranged upstream of second throttle valve 16. Air flow meter 14 contains a temperature sensor and is structured to sense a temperature of intake air at an intake inlet.

Air cleaner 13 is arranged upstream of air flow meter 14.

First throttle valve 15 controls the intake air quantity of internal combustion engine 1, depending on the load. Second throttle valve 16 controls an intake pressure upstream of a compressor 22 described below.

Internal combustion engine 1 is connected to exhaust passage 4 in which an upstream exhaust catalyst 17, a downstream exhaust catalyst 18, an underfloor catalyst 19, and a muffler 20 are provided, wherein upstream exhaust catalyst 17 is a three-way catalyst or the like, wherein downstream exhaust catalyst 18 is a three-way catalyst or the like, wherein underfloor catalyst 19 is a three-way catalyst or the like, and wherein muffler 20 is structured to reduce an exhaust sound.

Downstream exhaust catalyst 18 is arranged downstream of upstream exhaust catalyst 17, and upstream of underfloor catalyst 19. Underfloor catalyst 19 is arranged downstream of downstream exhaust catalyst 18. Muffler 20 is arranged downstream of underfloor catalyst 19.

Internal combustion engine 1 is further provided with a turbocharger 21.

Turbocharger 21 includes compressor 22 and a turbine 23, wherein compressor 22 is disposed in intake passage 3, and turbine 23 is disposed in exhaust passage 4. Compressor 22 and turbine 23 are arranged coaxially, and structured to rotate integrally. Compressor 22 is arranged upstream of first throttle valve 15 and downstream of second throttle valve 16. Turbine 23 is arranged upstream of upstream exhaust catalyst 17.

In intake passage 3, an intercooler 24 is provided downstream of first throttle valve 15 to cool intake air compressed (or pressurized) by compressor 22, and enhance efficiency of charging of intake air.

Intercooler 24 is arranged in an intercooler cooling path (or auxiliary cooling path) 27 as well as a radiator (or intercooler radiator) 25 and an electric pump 26. Intercooler 24 is structured to be supplied with a coolant (cooling water) cooled by radiator 25.

Intercooler cooling path 27 is structured to allow the coolant to circulate therein. Intercooler cooling path 27 is independent from a main cooling path not shown where cooling water circulates for cooling a cylinder block 28 of internal combustion engine 1.

Radiator 25 is structured to cool the coolant in intercooler cooling path 27 by heat exchange with outside air.

Electric pump 26 is structured to be driven to allow the coolant to circulate along an arrow A between radiator 25 and intercooler 24.

Exhaust passage 4 is connected to an exhaust bypass passage 31 that bypasses the turbine 23 and connects an upstream side of turbine 23 to a downstream side of turbine 23. Exhaust bypass passage 31 has a downstream end connected to a portion of exhaust passage 4 upstream of upstream exhaust catalyst 17. A wastegate valve 32 of an electronic type is placed in exhaust bypass passage 31, and structured to control a flow rate of exhaust gas in exhaust bypass passage 31.

Internal combustion engine 1 includes an EGR passage 33 branched from exhaust passage 4 and connected to intake passage 3, and is structured to perform exhaust gas recirculation (EGR) to bring (recirculate) a part of exhaust gas as an EGR gas from exhaust passage 4 into intake passage 3. EGR passage 33 has a first end connected to a portion of exhaust passage 4 between downstream exhaust catalyst 18 and underfloor catalyst 19, and a second end connected to a portion of intake passage 3 downstream of second throttle valve 16 and upstream of compressor 22. In EGR passage 33, an EGR valve 34 and an EGR cooler 35 are provided, wherein EGR valve 34 is of an electronic type and is structured to control the flow rate of EGR gas in EGR passage 33, and wherein EGR cooler 35 is structured to cool the EGR gas.

Internal combustion engine 1 includes an engine valve operating system including an intake-side variable valve mechanism 38 and an exhaust-side variable valve mechanism 39, wherein intake-side variable valve mechanism 38 is structured to vary valve timing (opening and closing timings) of intake valve 5, and wherein exhaust-side variable valve mechanism 39 is structured to vary valve timing (opening and closing timings) of exhaust valve 7. In this description, "engine valve" is used as a generic term for intake valve 5 and exhaust valve 7. Each of intake-side variable valve mechanism 38 and exhaust-side variable valve mechanism 39 is hydraulically driven in this example, and is controlled by a control signal from a control unit 40. Namely, control unit 40 serves as an intake-side variable valve mechanism control section (or control section) for controlling the intake-side variable valve mechanism 38, and also as an exhaust-side variable valve mechanism control section (or control section) for controlling the exhaust-side variable valve mechanism 39. Control unit 40 is configured to control the valve timing of intake valve 5 and the valve timing of exhaust valve 7 variably.

Each of intake-side variable valve mechanism 38 and exhaust-side variable valve mechanism 39 may be of a type structured to vary the opening timing and closing timing of the engine valve (intake valve 5 or exhaust valve 7) independently of each other, or may be of a type structured to advance and retard the opening timing and closing timing simultaneously with each other. In this embodiment, each of intake-side variable valve mechanism 38 and exhaust-side variable valve mechanism 39 is implemented by the latter type that is structured to advance and retard the phase of a camshaft 41, 42 with respect to a crankshaft 43. Each of intake-side variable valve mechanism 38 and exhaust-side variable valve mechanism 39 is not limited to hydraulic driving, but may be electrically driven by a motor or the like.

The actual valve timing of intake valve 5 is sensed by an intake camshaft position sensor 44 as an intake valve timing sensing section. Intake camshaft position sensor 44 is structured to sense the phase of intake camshaft 41 with respect to crankshaft 43.

The actual valve timing of exhaust valve 7 is sensed by an exhaust camshaft position sensor 45 as an exhaust valve timing sensing section. Exhaust camshaft position sensor 45 is structured to sense the phase of exhaust camshaft 42 with respect to crankshaft 43.

Control unit 40 is a well-known digital computer that includes a CPU, a ROM, a RAM, and an input and output interface.

Control unit 40 is configured to receive input of sensing signals (sensing values) from sensors, i.e. air flow meter 14, exhaust camshaft position sensor 45, a crank angle sensor 46 for sensing a crank angle of crankshaft 43 and also the engine speed, an accelerator opening sensor 47 for sensing a quantity of depression of an accelerator pedal (i.e. accelerator opening APO) indicative of a state of requested load of internal combustion engine 1, a water temperature sensor 48 for sensing a temperature of the coolant, an oil temperature sensor 49 for sensing a temperature of engine oil, a humidity sensor 50 for sensing the humidity of intake air, etc.

Water temperature sensor 48 is structured to sense the temperature of the cooling water flowing through a water jacket 61 in cylinder block 28.

Control unit 40 calculates a requested load of internal combustion engine 1 (i.e. engine load) based on the sensing value of accelerator opening sensor 47.

Control unit 40 is further configured to sense an SOC (State Of Charge), which is a ratio of a remaining charge quantity to a charge capacity, of an on-vehicle battery 62, wherein on-vehicle battery 62 supplies electric power to ignition plug 10. Thus, control unit 40 serves as a battery SOC sensing section.

Based on the sensing signals from the various sensors, control unit 40 optimally controls the fuel injection quantity and fuel injection timing of each of first fuel injection valve 8 and second fuel injection valve 9, the ignition timing and ignition energy of ignition plug 10, the valve timing of intake valve 5, the valve timing of exhaust valve 7, the opening of first throttle valve 15, the opening of second throttle valve 16, the opening of wastegate valve 32, the opening of EGR valve 34, a mechanical compression ratio of internal combustion engine 1, etc., wherein the mechanical compression ratio is set by variable compression ratio mechanism 2.

Control unit 40 further controls the air fuel ratio of internal combustion engine 1, depending on the operating state of internal combustion engine 1. Specifically, as shown in FIG. 2, control unit 40 controls the air fuel ratio to a stoichiometric air fuel ratio setting when in predetermined first operation region A, and controls the air fuel ratio to be leaner when in a predetermined second operation region "B" of low speed and low load than in first operation region A.

In other words, when the operating state of internal combustion engine 1 in a region other than second operation region B of low speed and low load (i.e. in the first operation region), a target air fuel ratio is set for achievement of $\lambda=1$ where $\lambda$ represents an excess air ratio. When the operating state of internal combustion engine 1 is in second operation region B, the target air fuel ratio is set for achievement of $\lambda=2$ or so in this example, where $\lambda$ represents the excess air ratio.

Figure 2:
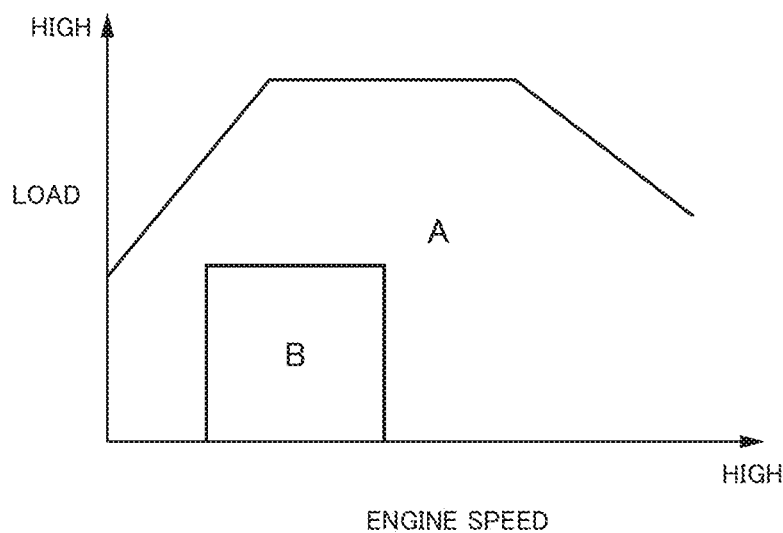
FIG. 2 is an explanatory diagram schematically showing a map used for calculation of an air fuel ratio.

FIG. 2 is an air fuel ratio map stored in control unit 40, in which the air fuel ratio is determined depending on the engine load and engine speed.

For performing the air fuel ratio control described above, internal combustion engine 1 requires a precise combustion control in a transient situation, in consideration of low robustness in combustion when in an operation region where the air fuel ratio is lean, and environmental variation, component variation, cylinder-to-cylinder variation, and others.

Even when there is no valve overlap period (valve overlap amount) in which the intake valve opening period and the exhaust valve opening period overlap with each other, the condition that the exhaust valve closing timing is after top dead center causes the internal EGR (residual gas) to be excessive, and thereby adversely affects the combustion stability.

In case that a control is performed in a transient situation with attention to a deviation between a target value of the valve overlap amount and an actual value of the valve overlap amount, the actual value of the valve overlap amount contains a variation in the intake valve operating mechanism and a variation in the exhaust valve operating mechanism. Therefore, there is a possibility that internal EGR (residual gas) becomes excessive, and it is required to set a margin based on these variations.

Furthermore, in case that one of the intake valve operating mechanism and exhaust valve operating mechanism is implemented by a hydraulically operated type, change of the valve overlap amount may be slow due to the outside air temperature environment. Therefore, if the air fuel ratio is to be controlled by the valve overlap amount, in a situation that the operating state shifts from an operation region where the excess air ratio $\lambda$ is approximately equal to 2 to an operation region where the excess air ratio $\lambda$ is approximately equal to 1, a time period during which the excess air ratio $\lambda$ takes an intermediate value between $\lambda=1$ and $\lambda=2$ may be long, thereby increasing an NOx emission amount.

In view of the foregoing, for internal combustion engine 1 that performs combustion with the air fuel ratio set leaner than the stoichiometric setting (i.e. lean-burn combustion), the present embodiment is configured to suppress instability of the combustion during a transient phase, and thereby suppress the exhaust performance from being adversely affected, and improve the reliability of fuel consumption reduction based on lean-burn combustion.

When in first operation region (stoichiometric-burn operation region) A, first fuel injection valve 8 directly injects fuel into the cylinder in a predetermined first injection mode (stoichiometric-burn injection mode), and ignition plug 10 ignites the air-fuel mixture in the cylinder in a predetermined first ignition mode (stoichiometric-burn ignition mode).

In the first injection mode, single-stage injection is performed in which fuel injection is performed once per combustion cycle.

When in first operation region A, intake valve 5 is controlled to a first intake valve timing setting (or stoichiometric-burn intake valve timing setting) such that the intake valve opening timing is set retarded with respect to top dead center. Thus, control unit 40 serves as a control section for shifting the valve timing of intake valve 5 and the air fuel ratio, depending on the operating state.

When in first operation region A, exhaust valve 7 is controlled to a first exhaust valve timing setting (or stoichiometric-burn exhaust valve timing setting) such that the exhaust valve close timing is about 10° CA after top dead center in this example. Thus, control unit 40 serves as a control section for shifting the valve timing of exhaust valve 7 and the air fuel ratio, depending on the operating state.

When in second operation region (lean-burn operation region) B, first fuel injection valve 8 injects fuel directly into the cylinder in a predetermined second injection mode (lean-burn injection mode) in which the air-fuel mixture is greater in uniformity than in the first injection mode, and ignition plug 10 ignites the air-fuel mixture in the cylinder in a predetermined second ignition mode (lean-burn ignition mode) in which the ignition energy is enhanced more than in the first ignition mode.

When in the second injection mode, multi-stage injection is performed for injecting fuel a plurality of times per combustion cycle.

When in the second ignition mode, the electric power supplied to ignition plug 10 is enhanced more and the ignition energy is enhanced more than in the first ignition mode.

In second operation region B, intake valve 5 is controlled to a second intake valve timing setting (lean-burn intake valve timing setting) such that the intake valve opening timing is set advanced with respect to top dead center.

In other words, in second operation region B, intake valve 5 is controlled to the second intake valve timing setting such that the intake valve opening timing is set advanced with respect to the first intake valve timing setting.

In second operation region B, exhaust valve 7 is controlled to a second exhaust valve timing setting (lean-burn exhaust valve timing setting) such that the exhaust valve closing timing is set at top dead center, thereby reducing the internal EGR (residual gas).

In other words, in second operation region B, exhaust valve 7 is controlled to the second exhaust valve timing setting such that the exhaust valve closing timing is set advanced with respect to the first exhaust valve timing setting.

Figure 3:
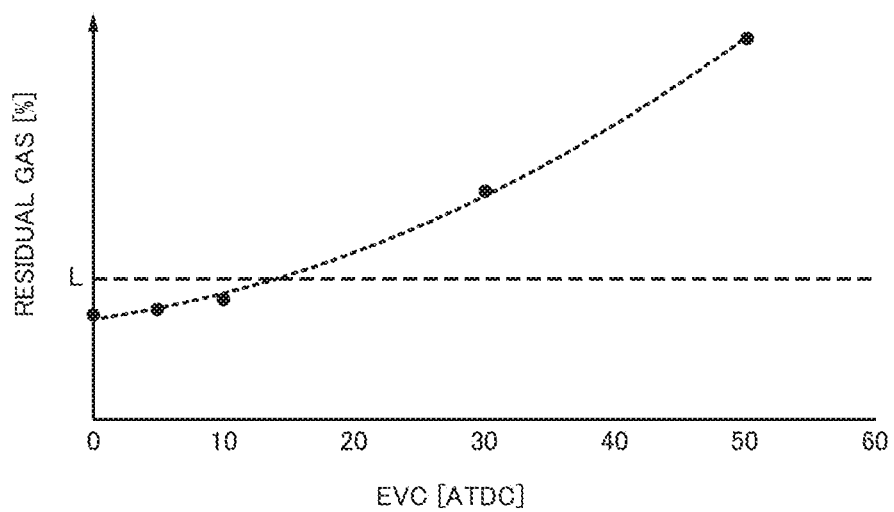
FIG. 3 is an explanatory diagram schematically showing a correlation between an exhaust valve closing timing and an internal EGR.

FIG. 3 is an explanatory diagram schematically showing a correlation between the exhaust valve closing timing and the internal EGR (residual gas). The internal EGR (residual gas) increases as the exhaust valve closing timing retards with respect to top dead center.

Therefore, when in first operation region A, the closing timing of exhaust valve 7 may be set to be more than or equal to 10° CA after top dead center, thereby improving the fuel efficiency. When in second operation region B, the closing timing of exhaust valve 7 may be set between top dead center and 10° CA after top dead center, thereby suppressing the combustion from becoming unstable. Namely, the second exhaust valve timing setting may be set in a range where the internal EGR (residual gas) does not exceed an allowable limit value L.

In the present embodiment, satisfaction of a predetermined lean-burn combustion precondition is a precondition for shifting the air fuel ratio to the lean air fuel ratio setting. Namely, if the lean-burn combustion precondition is not satisfied, the air fuel ratio is maintained at the predetermined air fuel ratio setting even if the operating state is in second operation region B.

In this example, the lean-burn combustion precondition is determined as satisfied, when the intake air temperature is higher than or equal to a predetermined temperature point, the humidity is higher than or equal to a predetermined humidity point, the cooling water temperature is higher than or equal to a predetermined temperature point, and the variable valve mechanism and other devices are able to operate normally.

The determination as to whether or not the lean-burn combustion precondition is satisfied is performed by control unit 40 at intervals of a predetermined constant time period after internal combustion engine 1 is started up. Accordingly, when the operating state shifts from first operation region A into second operation region B, it determines whether or not the air fuel ratio may be shifted, based on the latest determination result of the lean-burn combustion precondition.

When the operating state shifts from first operation region A into second operation region B with the lean-burn combustion precondition satisfied, and a predetermined lean-burn combustion permission condition is satisfied, it is determined that the lean-burn combustion is possible, and the air fuel ratio is shifted to the lean air fuel ratio setting.

For example, the lean-burn combustion permission condition is determined as satisfied, when the actual valve timing of intake valve 5 is set at the second intake valve timing setting and the actual valve timing of exhaust valve 7 is set at the second exhaust valve timing setting. This determination is performed by control unit 40.

In a situation that the operating state shifts from first operation region A into second operation region B, the valve timing of intake valve 5 starts to change toward the second intake valve timing setting when the operating state shifts from first operation region A into second operation region B.

In the situation that the operating state shifts from first operation region A into second operation region B, the valve timing of exhaust valve 7 starts to change toward the second exhaust valve timing setting when the operating state shifts from first operation region A into second operation region B.

With the lean-burn combustion precondition satisfied, the air fuel ratio starts to be shifted to the lean air fuel ratio setting, a first preset time period T1 after the actual valve timing of intake valve 5 is set at the second intake valve timing setting and the actual valve timing of exhaust valve 7 is set at the second exhaust valve timing setting.

In the situation that the operating state shifts from first operation region A into second operation region B, the injection mode is shifted from the first injection mode to the second injection mode, when the actual valve timing of intake valve 5 is shifted from the first intake valve timing setting to the second intake valve timing setting and the actual valve timing of exhaust valve 7 is shifted from the first exhaust valve timing setting to the second exhaust valve timing setting.

In the situation that the operating state shifts from first operation region A into second operation region B, the ignition mode is shifted from the first ignition mode to the second ignition mode, when the actual valve timing of intake valve 5 is set at the second intake valve timing setting and the actual valve timing of exhaust valve 7 is set at the second exhaust valve timing setting.

In a situation that the operating state shifts from second operation region B into first operation region A, after a second preset time period T2 has elapsed since the air fuel ratio is shifted to be stoichiometric, the valve timing of intake valve 5 is set to the first intake valve timing setting, and the valve timing of exhaust valve 7 is shifted to the first exhaust valve timing setting, and the injection mode is shifted from the second injection mode to the first injection mode, and the ignition mode is shifted from the second ignition mode to the first ignition mode.

First preset time period T1 is calculated when the valve timing of intake valve 5 is set at the second intake valve timing setting and the valve timing of exhaust valve 7 is set at the second exhaust valve timing setting. Namely, first preset time period T1 is calculated at a timing when the valve timings of both intake valve 5 and exhaust valve 7 are set for lean-burn combustion.

For example, first preset time period T1 is determined in accordance with the engine speed and engine load at the timing when the valve timings of intake valve 5 and exhaust valve 7 are set for lean-burn combustion.

Second preset time period T2 is calculated when the operating state shifts from second operation region B into first operation region A. Second preset time period T2 is set at the largest value of an injection mode shift delay time period T2$i$, an ignition mode shift delay time period T2$e$, a valve timing shift delay time period T2$v$ for intake valve 5, and a valve timing shift delay time period T2$w$ for exhaust valve 7, which are calculated when the operating state shifts from second operation region B into first operation region A. For example, each of delay time periods T2$i$, T2$e$, T2$v$, T2$w$ is determined in accordance with the engine speed and engine load at the timing when the operating state shifts from second operation region B into first operation region A. Delay time periods T2$i$, T2$e$, T2$v$, T2$w$ are longer than a time period until the air fuel ratio shifts to be stoichiometric after the operating state shifts from second operation region B into first operation region A.

Figure 4:
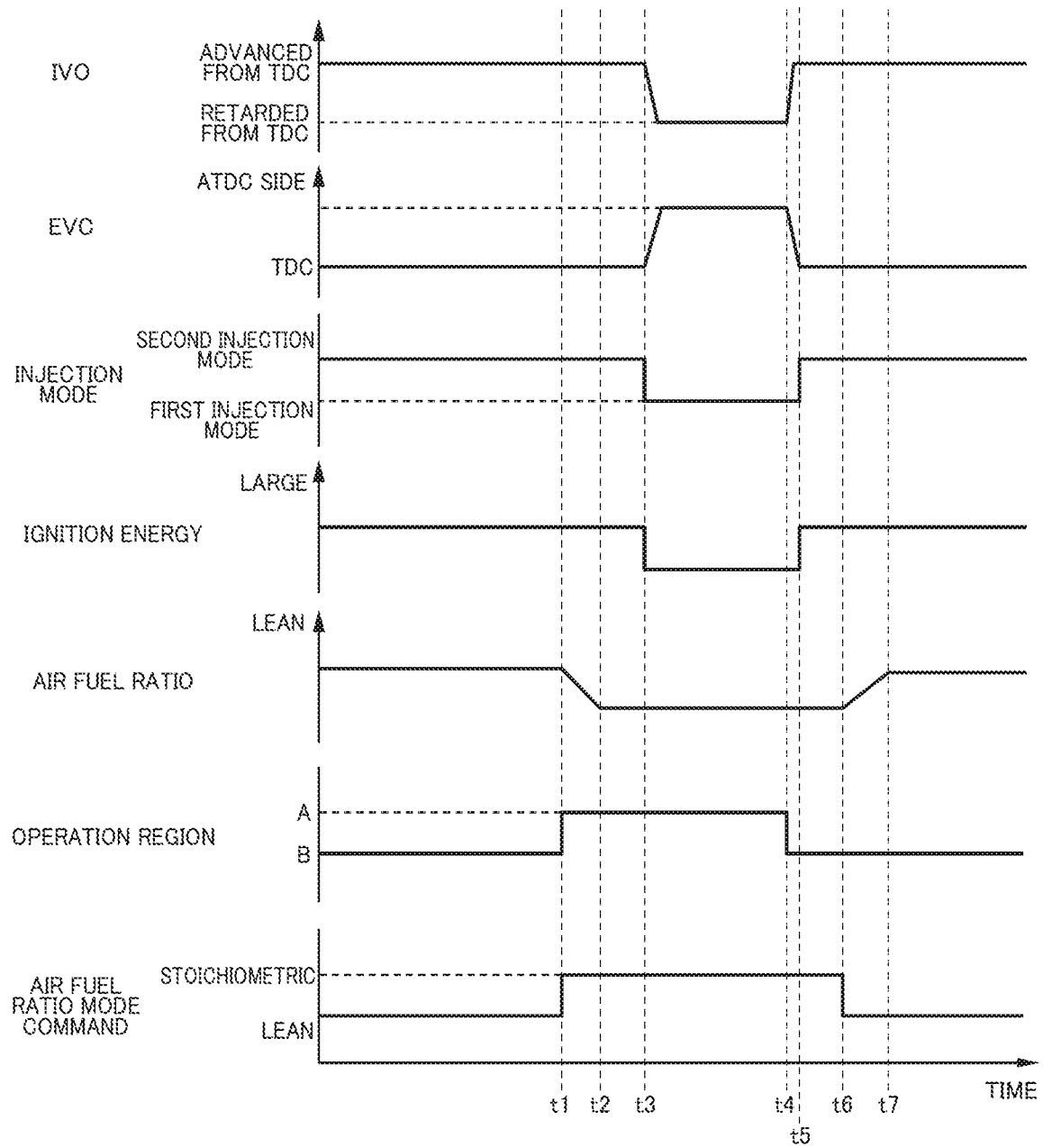
FIG. 4 is a timing chart illustrating shifting of the air fuel ratio.

FIG. 4 is a timing chart illustrating shifting of the air fuel ratio. FIG. 4 shows a situation where the operating state shifts from second operation region B into first operation region A, and thereafter shifts from first operation region A into second operation region B.

At a time instant t1, the operating state of internal combustion engine 1 shifts from second operation region B into first operation region A. Before time instant t1, the lean-burn combustion precondition is determined as satisfied.

With regard to an air fuel ratio shifting command (air fuel ratio mode command), a command for shifting from lean to stoichiometric is issued at time instant t1. Accordingly, shifting of the air fuel ratio of internal combustion engine 1 is started at time instant t1. At a time instant t2, the shifting of the air fuel ratio started at time instant t1 is completed.

Shifting of intake valve 5 from the second intake valve timing setting to the first intake valve timing setting is started at a time instant t3 when second preset time period T2 has elapsed since time instant t1.

In this way, in situations that the air fuel ratio shifts from lean to stoichiometric, the valve timing of intake valve 5 is maintained at the second intake valve timing setting until the shifting of the air fuel ratio to stoichiometric is completed.

This serves to reduce the valve overlap amount between the intake valve opening period and the exhaust valve opening period, and thereby suppress the internal EGR (residual gas), and perform the lean-burn combustion stably, in situations that the operating state of internal combustion engine 1 shifts and the air fuel ratio is shifted from lean to stoichiometric.

Shifting of exhaust valve 7 from the second exhaust valve timing setting to the first exhaust valve timing setting is started at time instant t3 when second preset time period T2 has elapsed since time instant t1.

In this way, in situations that the air fuel ratio shifts from lean to stoichiometric, the second exhaust valve timing setting with which the internal EGR (residual gas) is small is maintained until the shifting of the air fuel ratio to stoichiometric is completed.

This serves to achieve reliable ignition, in situations that the operating state of internal combustion engine 1 shifts and the air fuel ratio is shifted from lean to stoichiometric, and thereby prevent misfiring and ensure functional reliability, and improve exhaust performance and fuel efficiency.

The injection mode of first fuel injection valve 8 is shifted from the second injection mode to the first injection mode at time instant t3 when second preset time period T2 has elapsed since time instant t1.

The ignition mode of the spark plug 10 is shifted from the second ignition mode to the first ignition mode at time instant t3 when second preset time period T2 has elapsed since time instant t1.

In this way, in situations that the air fuel ratio is shifted from lean to stoichiometric, the second injection mode in which the uniformity of the air-fuel mixture is relatively high is maintained, and the second ignition mode in which the ignition energy is enhanced is maintained until the shifting of the air fuel ratio to stoichiometric is completed.

This serves to achieve reliable ignition, in situations that the operating state of internal combustion engine 1 shifts and the air fuel ratio is shifted from lean to stoichiometric, and thereby prevent misfiring and ensure functional reliability, and improve exhaust performance and fuel efficiency.

At a time instant t4, the operating state of internal combustion engine 1 shifts from first operation region A into second operation region B.

Shifting of intake valve 5 from the first intake valve timing setting to the second intake valve timing setting is started at time instant t4.

This serves to reduce the valve overlap amount between the intake valve opening period and the exhaust valve opening period, and thereby suppress the internal EGR (residual gas), and perform the lean-burn combustion stably, in situations that the operating state of internal combustion engine 1 shifts and the air fuel ratio is shifted from stoichiometric to lean.

Shifting of exhaust valve 7 from the first exhaust valve timing setting to the second exhaust valve timing setting is started at time instant t4.

In this way, in situations that the air fuel ratio is shifted from stoichiometric to lean, the valve timing is shifted to the second exhaust valve timing setting with which the internal EGR (residual gas) is small, before shifting of the air fuel ratio is started.

This serves to achieve reliable ignition, in situations that the operating state of internal combustion engine 1 shifts and the air fuel ratio is shifted from stoichiometric to lean, and thereby prevent misfiring and ensure functional reliability, and improve exhaust performance and fuel efficiency.

At a time instant t5, intake valve 5 is set at the second intake valve timing setting, and exhaust valve 7 is set at the second exhaust valve timing setting. It is assumed that at time instant t5, the lean-burn combustion precondition is satisfied according to the latest determination result.

With regard to the air fuel ratio shifting command (air fuel ratio mode command), a command for shifting from stoichiometric to lean is issued at a time instant t6 when first preset time period T1 has elapsed since time instant t5. Accordingly, shifting of the air fuel ratio of internal combustion engine 1 is started at time instant t6. At a time instant t7, the shifting of the air fuel ratio started at time instant t6 is completed.

The injection mode of first fuel injection valve 8 is shifted from the first injection mode to the second injection mode at time instant t5.

The ignition mode of ignition plug 10 is shifted from the first ignition mode to the second ignition mode at time instant t5.

In this way, in situations that the air fuel ratio is shifted from stoichiometric to lean, the injection mode is shifted to the second injection mode in which the uniformity of the air-fuel mixture is relatively high, and the ignition mode is shifted to the second ignition mode in which the ignition energy is enhanced, before the shifting of the air fuel ratio is started.

This serves to achieve reliable ignition, in situations that the operating state of internal combustion engine 1 shifts and the air fuel ratio is shifted from stoichiometric to lean, and thereby prevent misfiring and ensure functional reliability, and improve exhaust performance and fuel efficiency.

Figure 5:
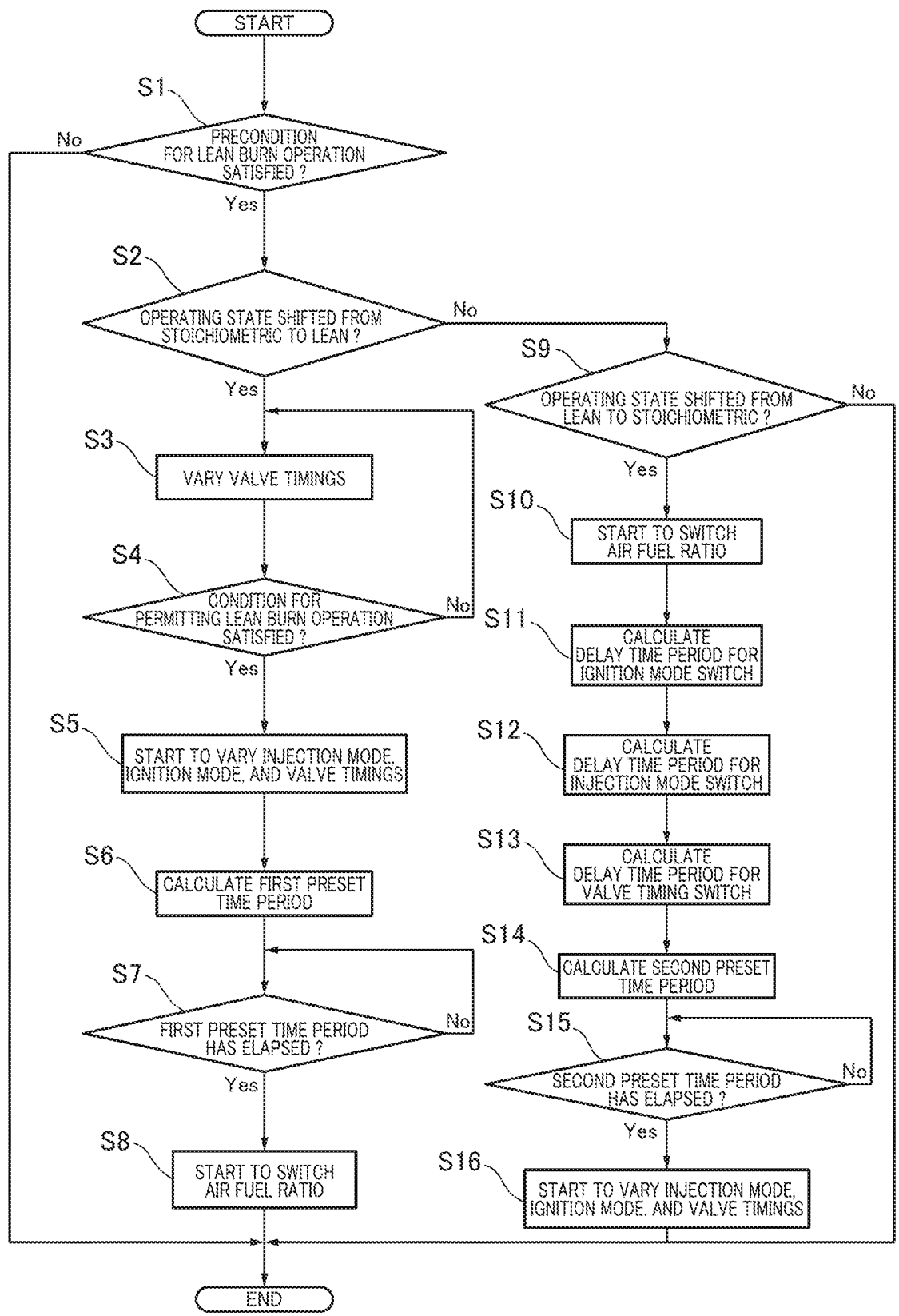
FIG. 5 is a flowchart showing a flow of control of the internal combustion engine according to the present disclosure.

FIG. 5 is a flowchart showing a flow of the control of internal combustion engine 1 described above.

At Step S1, it determines whether or not the lean-burn combustion precondition is satisfied. When it is determined at Step S1 that the lean-burn combustion precondition is satisfied, the process proceeds to Step S2.

When it is determined at Step S1 that the lean-burn combustion precondition is not satisfied, it inhibits the lean-burn combustion and terminates the current routine. When the lean-burn combustion is inhibited at Step S1, internal combustion engine 1 is operated with the air fuel ratio set at the stoichiometric air fuel ratio setting regardless of the operating state.

At Step S2, it determines whether or not the operating state of internal combustion engine 1 has shifted from first operation region A into second operation region B. When it is determined at Step S2 that the operating state of internal combustion engine 1 has shifted from first operation region A into second operation region B, the process proceeds to Step S3. When it is determined at Step S2 that the operating state of internal combustion engine 1 has not shifted from first operation region A into second operation region B, the process proceeds to Step S9.

At Step S3, it shifts the valve timing. Namely, at Step S3, it shifts the valve timing of intake valve 5 and the valve timing of exhaust valve 7 to the settings for lean-burn combustion.

At Step S4, it determines whether or not the lean-burn combustion permission condition is satisfied. When it is determined at Step S4 that the lean-burn combustion permission condition is satisfied, the process proceeds to Step S5. When it is determined at Step S4 that the lean-burn combustion permission condition is not satisfied, the process proceeds to Step S3.

At Step S5, it starts to shift the injection mode, the ignition mode, and the valve timing.

At Step S6, it calculates first preset time period T1 when the valve timings of intake valve 5 and exhaust valve 7 are shifted to the settings for lean-burn combustion.

At Step S7, it determines whether or not first preset time period T1 has elapsed since the valve timings of intake valve 5 and exhaust valve 7 are shifted to the settings for lean-burn combustion. When it is determined at Step S7 that first preset time period T1 has elapsed since the shifting to the settings for lean-burn combustion, the process proceeds to Step S8.

At Step S8, it shifts the air fuel ratio from stoichiometric to lean.

At Step S9, it determines whether or not the operating state of internal combustion engine 1 has shifted from second operation region B into first operation region A. When it is determined at Step S9 that the operating state of internal combustion engine 1 has shifted from second operation region B into first operation region A, the process proceeds to Step S10. When it is determined at Step S9 that the operating state of internal combustion engine 1 has not shifted from second operation region B into first operation region A, it determines that there is no shifting in the operating state of internal combustion engine 1, and terminates the current routine.

At Step S10, it starts to shift the air fuel ratio when the operating state has shifted from second operation region B into first operation region A.

At Step S11, it calculates ignition mode shift delay time period T2*e* when the operating state has shifted from second operation region B into first operation region A.

At Step S12, it calculates injection mode shift delay time period T2*i* when the operating state has shifted from second operation region B into first operation region A.

At Step S13, it calculates valve timing shift delay time period T2*v* for intake valve 5 and valve timing shift delay time period T2*w* for exhaust valve 7 when the operating state has shifted from second operation region B into first operation region A.

At Step S14, it sets second preset time period T2 to the longest one of ignition mode shift delay time period T2*e*, injection mode shift delay time period T2*i*, and valve timing shift delay time periods T2*v*, T2*w*.

When it is determined at Step S15 that second preset time period T2 has elapsed since the operating state has shifted, the process proceeds to Step S16.

At Step S16, it starts to shift the injection mode, the ignition mode, the valve timing of intake valve 5, and the valve timing of exhaust valve 7 when second preset time period T2 has elapsed since the operating state has shifted.

The internal EGR (residual gas) is influenced more by the closing timing of exhaust valve 7 than by the intake valve opening timing. Therefore, in situations that the operating state shifts from first operation region A into second operation region B, the internal EGR (residual gas) during the transient phase can be reduced also by shifting the air fuel ratio from stoichiometric to lean when first preset time period T1 has elapsed since the actual valve timing of exhaust valve 7 has shifted from the first exhaust valve timing setting to the second exhaust valve timing setting.

The valve timing of intake valve 5 and the valve timing of exhaust valve 7 may deviate due to environmental influences, deterioration or wear of movable parts, and others. Namely, a deviation may occur between the actual valve timing and the target value of the valve timing, and thereby prevent permission of the lean-burn combustion. Therefore, a correction learning for the valve timing may be appropriately performed to correct the deviation of the valve timing due to deterioration over time or the like. For example, the correction learning for the valve timing may be performed, when a predetermined learning condition, such as a condition that the water temperature or the outside air temperature is higher than or equal to a predetermined temperature point, is satisfied.

The intake valve mechanism may be a common direct-acting valve mechanism with which the lift operation angle and lift center phase of intake valve 5 are constant. The embodiment described above relates to the control method for internal combustion engine 1 and the control device for internal combustion engine 1.

The invention claimed is:

1. An internal combustion engine control method comprising:
   setting exhaust valve timing at a first exhaust valve timing setting and setting intake valve timing at a first intake valve timing setting when in a first operation region for operating an internal combustion engine with an air fuel ratio set at a predetermined air fuel ratio setting;
   setting the exhaust valve timing at a second exhaust valve timing setting and setting the intake valve timing at a second intake valve timing setting when in a second operation region for operating the internal combustion engine with the air fuel ratio set leaner than the predetermined air fuel ratio setting, wherein the second exhaust valve timing setting is more advanced than the first exhaust valve timing setting, wherein the second intake valve timing setting is more advanced than the first intake valve timing setting; and
   in response to a shift of an operating state of the internal combustion engine from the first operation region into the second operation region, starting a shift of the air fuel ratio after the exhaust valve timing is actually set at the second exhaust valve timing setting and the intake valve timing is actually set at the second intake valve timing setting.

2. The internal combustion engine control method as claimed in claim 1, comprising implementing the second intake valve timing setting by setting an intake valve opening timing advanced from top dead center.

3. An internal combustion engine control method comprising:
   setting exhaust valve timing at a first exhaust valve timing setting when in a first operation region for operating an internal combustion engine with an air fuel ratio set at a predetermined air fuel ratio setting;
   setting the exhaust valve timing at a second exhaust valve timing setting when in a second operation region for operating the internal combustion engine with the air fuel ratio set leaner than the predetermined air fuel ratio setting, wherein the second exhaust valve timing setting is more advanced than the first exhaust valve timing setting;

in response to a shift of an operating state of the internal combustion engine from the first operation region into the second operation region, starting a shift of the air fuel ratio after the exhaust valve timing is actually set at the second exhaust valve timing setting; and implementing the second exhaust valve timing setting by setting an exhaust valve closing timing in a range from top dead center to 10° CA after top dead center.

4. An internal combustion engine control method comprising:

setting exhaust valve timing at a first exhaust valve timing setting when in a first operation region for operating an internal combustion engine with an air fuel ratio set at a predetermined air fuel ratio setting;

setting the exhaust valve timing at a second exhaust valve timing setting when in a second operation region for operating the internal combustion engine with the air fuel ratio set leaner than the predetermined air fuel ratio setting, wherein the second exhaust valve timing setting is more advanced than the first exhaust valve timing setting;

in response to a shift of an operating state of the internal combustion engine from the first operation region into the second operation region, starting a shift of the air fuel ratio after the exhaust valve timing is actually set at the second exhaust valve timing setting; and in response to a shift of the operating state of the internal combustion engine from the second operation region into the first operation region, starting a shift of the exhaust valve timing to the first exhaust valve timing setting after completing a shift of the air fuel ratio to the predetermined air fuel ratio setting.

5. An internal combustion engine control method comprising:

setting exhaust valve timing at a first exhaust valve timing setting when in a first operation region for operating an internal combustion engine with an air fuel ratio set at a predetermined air fuel ratio setting;

setting the exhaust valve timing at a second exhaust valve timing setting when in a second operation region for operating the internal combustion engine with the air fuel ratio set leaner than the predetermined air fuel ratio setting, wherein the second exhaust valve timing setting is more advanced than the first exhaust valve timing setting;

in response to a shift of an operating state of the internal combustion engine from the first operation region into the second operation region, starting a shift of the air fuel ratio after the exhaust valve timing is actually set at the second exhaust valve timing setting; and in response to a shift of the operating state of the internal combustion engine from the second operation region into the first operation region, shifting the exhaust valve timing to the first exhaust valve timing setting, and shifting the intake valve timing to a first intake valve timing setting, after completing a shift of the air fuel ratio to the predetermined air fuel ratio setting, wherein the first intake valve timing setting is employed in the first operation region.

6. An internal combustion engine control device comprising:

an exhaust-side variable valve mechanism structured to vary exhaust valve timing;

an exhaust valve timing sensing section structured to sense the exhaust valve timing; and a control section configured to shift the exhaust valve timing and an air fuel ratio, depending on an operating state of an internal combustion engine;

wherein the control section is configured to:

start a shift of the air fuel ratio after the exhaust valve timing is actually set at a second exhaust valve timing setting, in response to a shift of the operating state from a first operation region into a second operation region, wherein the first operation region is for operating the internal combustion engine with the air fuel ratio set at a predetermined air fuel ratio setting, wherein the second operation region is for operating the internal combustion engine with the air fuel ratio set leaner than the predetermined air fuel ratio setting, and wherein the second exhaust valve timing setting is employed in the second operation region; and start a shift of the exhaust valve timing to a first exhaust valve timing setting after completing a shift of the air fuel ratio to the predetermined air fuel ratio setting, in response to a shift of the operating state of the internal combustion engine from the second operation region into the first operation region, wherein the first exhaust valve timing setting is employed in the first operation region.

* * * * *